Figure 1:
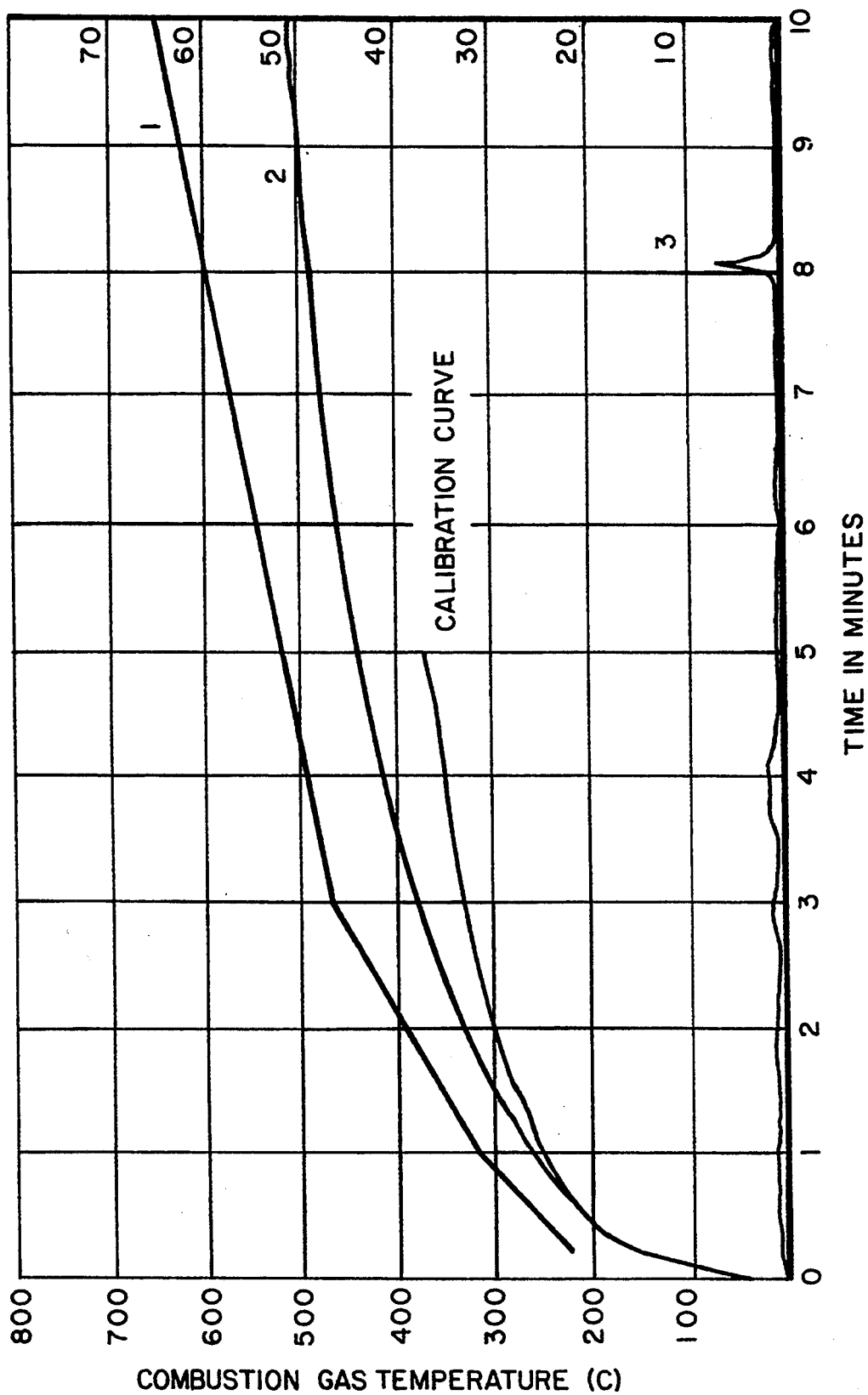

United States Patent [19]
Valso

[11] Patent Number: 5,342,656
[45] Date of Patent: Aug. 30, 1994

[54] FLAME RETARDING AND SMOKE RETARDING MIXTURE

[76] Inventor: Arve Valso, Andreasflata 3, N-7300 Orkanger, Norway

[21] Appl. No.: 855,011
[22] PCT Filed: Jun. 25, 1990
[86] PCT No.: PCT/NO90/00106
§ 371 Date: Jan. 2, 1992
§ 102(e) Date: Jan. 2, 1992
[87] PCT Pub. No.: WO91/00326
PCT Pub. Date: Jan. 10, 1991

[30] Foreign Application Priority Data

Jul. 3, 1989 [NO] Norway ................ 892737

[51] Int. Cl.$^5$ ............... B32B 27/00; C09K 21/02; C09K 21/10
[52] U.S. Cl. ............... 427/394; 427/396; 427/397; 427/439; 427/440; 252/602; 252/607; 252/608
[58] Field of Search ......... 252/602, 607, 608; 427/394

[56] References Cited

U.S. PATENT DOCUMENTS

| | | | |
|---|---|---|---|
| 3,409,550 | 11/1968 | Gould | 252/8 |
| 3,806,488 | 4/1974 | Stone et al. | 252/601 |
| 4,182,681 | 1/1980 | Gumbert | 252/8 |
| 4,468,495 | 8/1984 | Pearson | 525/158 |
| 4,514,327 | 4/1985 | Rock | 252/607 |
| 4,842,611 | 6/1989 | Hoffman | 8/188 |
| 4,908,160 | 3/1990 | Thacker | 252/608 |
| 4,971,728 | 11/1990 | Vandersall | 252/603 |

FOREIGN PATENT DOCUMENTS 2196659 5/1988 United Kingdom .

OTHER PUBLICATIONS

Chemical Abstracts, vol. 91, No. 16, 15 Oct. 1979, (Columbus, Ohio, US), Anon.: "Improved intumescent fire retardant coating composition".
Chemical Abstracts, vol. 105, No. 6, 11 Aug. 1986, (Columbus, Ohio, US), Izumikawa, M. et al.: "Flame spread of paper sheets containing suppressants".
Research Disclosure Jul. 1979 #18306; Chemical Abstract vol. 105 (1986) No. 6, pp 1413-1419.

Primary Examiner—Richard D. Lovering
Assistant Examiner—Joseph D. Anthony
Attorney, Agent, or Firm—James E. Pittenger

[57] ABSTRACT

Flame retarding and smoke retarding aqueous solutions consisting essentially of: 70–96 weight % of a mixture of ammonium phosphate and ammonium sulphate, 1–20 weight % NaHCO$_3$, 1–10 weight % EDTA, and water in an amount resulting in an aqueous solution comprising 11–45 weight % solids on the basis of the total weight of the aqueous solution. Methods of producing and using the flame retarding and smoke retarding aqueous solutions to impregnate absorbent porous materials, such as wood, rayon, cotton, wool and similar textile materials are also taught.

5 Claims, 2 Drawing Sheets

1: LIMIT CURVE
2: TEMPERATURE CURVE
3: SMOKE DENSITY CURVE

FLAME RETARDING AND SMOKE RETARDING MIXTURE

The present invention concern a flame retarding and smoke retarding mixture, a method for producing a solution of the mixture and the application of the mixture for treating materials that are normally combustible.

Means are known how to apply different substances and mixtures to treat materials that are normally combustible to make them less combustible and work as smoke retardants.

Different chemical compounds with flame retarding or smoke retarding characteristics are described in U.S. Pat. Nos. 4,168,175; 4,342,669 and 4,438,028 and GB Patent Specification no. 1,462,828. None of the mixtures described in these specifications give completely satisfactory results, since each mixture gives better results in one area than it does in other areas.

U.S. Pat. No. 4,595,414 describes the impregnation of cellulose materials with a mixture of monoammonium phosphate, diammonium phosphate, a freely-chosen corrosion inhibitor and a surfactant. This mixture has subsequently been found to be most effective for non-flammable impregnation of cellulose textiles. The difficulty with such impregnation substances is that they give a relatively hard, stiff cellulose. Phosphates can also contain colourful contaminants.

U.S. Pat. No. 4,514,327 describes a fire retardant mixture consisting of ammonium sulphate, borax, boric acid and monoammonium phosphate. This mixture will not supply wood with enough impregnation substance to meet the Norwegian classification for a fire retardant. In the production method filtration is mentioned through filters sized 5 micrometers, which will involve a very expensive process. Boric compounds such as borax and boric acid are also classified as health risks, partly because of the damage that can be done to the central nervous system. The use of such compounds must thus be considered unfortunate both in the production process and when utilizing the product such as in impregnated clothes. This patent specification does not cover the use of EDTA or $NaHCO_3$.

GB Patent Specification no. 2,165,270 describes a fire retardant mixture consisting of water-soluble monosodium phosphate, ammonium sulphate and borax and/or boric acid for the impregnation of porous materials. As mentioned above, this compound will also represent a danger. This specification does not mention the use of EDTA or $NaHCO_3$ to improve the impregnation and the fire retardant characteristics.

DE Patent Specification no. 2,732,561 describes a mixture that consists of ammonium ions, zinc ions, earth alkaline metal ions, chloride ions, bromide ions and phosphate ions. This patent specification also does not cover the use of EDTA or $NaHCO_3$ and the fire tests are not done in accordance with any standard.

The main objective of the present invention is to produce a mixture that gives better results than any existing known products for the impregnation of materials that are normally combustible to prevent the combustion of the treated materials, and prevent smoke development should they be ignited or exposed to excessive heat.

A second objective of the present invention is to produce a mixture for the impregnation of textiles made of materials such as rayon, cotton and wool, or other combustible, water-absorbent materials; and the impregnation of wood, paper and other cellulose (wood) products, as well as other organic materials.

A further objective with the present invention is to produce a nontoxic mixture that is neutral as far as color is concerned.

If a mixture is produced and used in accordance with the invention this will result in wood and textiles being impregnated to make them nonflammable and prevent smoke development should they be ignited or exposed to excessive heat.

Figure 2:
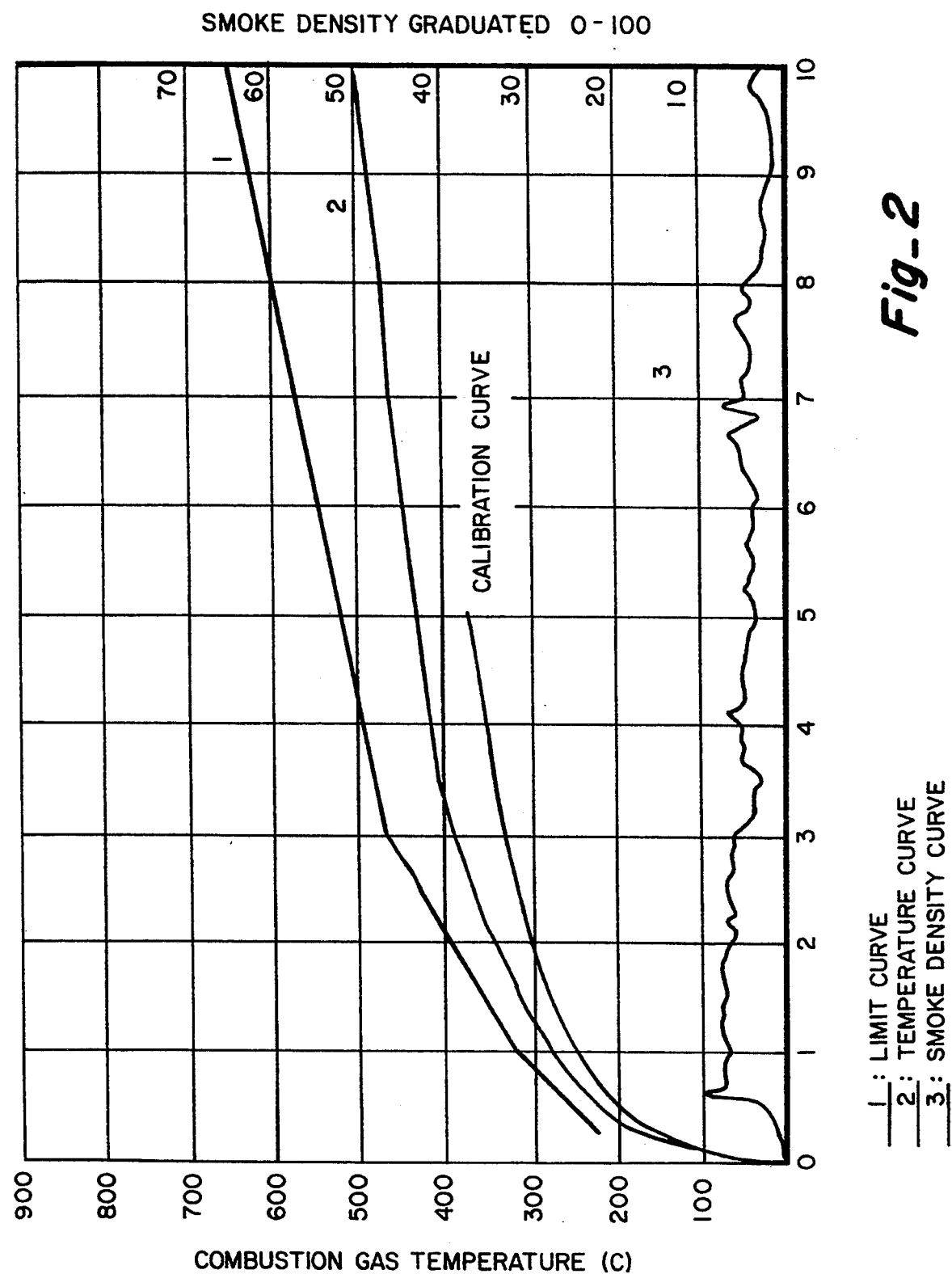

The invention will now be described in more detail where reference will be made to the figures, where FIG. 1 shows the results from a technical fire test of spruce paneling impregnated with a mixture in accordance with the invention, and FIG. 2 shows the same as FIG. 1, but impregnated pine is used as the test material.

The present invention has been developed to produce a mixture that is soluble in water for the treatment of materials that are normally are combustible so as to act as a flame retardant and smoke retardant.

The mixture in accordance with the present invention is composed of:

70–96 weight % monoammonium phosphate and/or diammonium phosphate and/or ammonium sulphate,
1–20 weight % $NaHCO_3$,
1–10 weight % EDTA,
0–28 weight % phosphoric acid (85%),
0–5 weight % normal additives.

The amounts given above are calculated in weight percentage on the basis of the total weight of the mixture. The mixture can contain less amounts of one or more additives such as surfactants, thickening agents, conservation agents or corrosion inhibitors.

The mechanism underlying the advantageous effect has not been completely explained. It is assumed that the following factors may be influential:

The addition of sodium hydrogen carbonate causes delayed migration and the so-called beating of the dried mixture from the treated material, at the same time as the treated material obtains a softer and smoother surface.

The addition of sodium hydrogen carbonate also makes it easier to remove the air from the mixture according to the invention during the impregnation process.

Sodium hydrogen carbonate in the mixture will give off $CO_2$-gas when heat is applied which will prevent the ignition of the material.

The addition of EDTA causes the contaminants in the components to be separated by being soluble in water and becoming residue. The pH value of the solution is to be from 3.50 to 9.00. A pH value between 6.70 and 6.80 gives least corrosion and reduces the need for the addition of corrosion inhibitors for the impregnation of wood. After impregnation and drying EDTA acts as a lattice binding agent for mixtures that thereby become more stable, at the same time as it acts as a flame retardant.

Production of a solution of such a mixture

A suitable amount of water is to be heated to between 30°–70° C. in an appropriate vessel and is kept at a stable temperature within the above-mentioned limits during the entire mixing process. The mixing vessel should be made of stainless steel or plastic, and equipped with a stirring device that gives good circulation in the liquid.

a) Ammonium sulphate is added to the water under constant stirring. Stirring continues until all the ammonium sulphate is dissolved, a minimum of 10 minutes stirring.

b) Mono- or diammonium phosphate is added to the mixture from step a) under constant stirring until all of it is dissolved, a minimum of 10 minutes stirring.

c) The mixture from step b) has sodium hydrogen carbonate added in small portions under constant stirring. The reaction in the mixture after the addition of each portion of sodium hydrogen carbonate is to be completed before a new portion of sodium hydrogen carbonate is added.

d) EDTA is added under constant stirring until all of it is dissolved, a minimum of 10 minutes stirring. Thereafter the agitator is stopped and the mixture is allowed to stand in the mixing vessel for 3–4 hours while the solid contaminants are allowed to precipitate. After this the supernatant is filtered to remove particles with a diameter larger than 100 micrometers (10 micrometers for the impregnation of wood).

The concentration of the mixture in the form of the solids in the solution can be adjusted to the planned application of the solution, this can vary from 5 and 45 weight percentage of solids calculated on the basis of the weight of the total solution.

Impregnation of wood

The impregnation of wood is best done in a conventional impregnation unit consisting of two horizontal, cylindrical tanks where one is above the other. The two tanks are connected by a pipe that has a valve fitted. The impregnation unit also consists of the equipment required to form a vacuum or pressurize the two tanks. A suitable unit for this is described in NO Patent no. 155,835. In relation to the present invention it is not necessary to describe the impregnation unit in more detail.

Wood that is to be impregnated is placed in the lower tank and the upper tank is filled with a solution of the mixture in accordance with the present invention. The impregnation process starts by the formation of a vacuum in the upper and lower tanks to remove almost all the air from the tanks and the wood in the lower tank. When wood is to be treated, the solution must not contain particles with diameters greater than 10 micrometers, and the solution must contain between 15 and 45 weight percentage of solids calculated on the basis of the weight of the total solution.

Once almost all the air has been removed, the connection between the two tanks is opened to allow the solution from the upper tank to run into the lower tank containing the wood. When the solution has run into the lower tank the valve seals the connection between the tanks and the lower tank is pressurized to about 12 bar for 1–4 hours. Then the pressure is released from the lower tank and the solution is drained. The wood is removed and dried in the conventional manner. Following drying, the wood is to be left with 15 to 30 weight percentage of the mixture calculated on the basis of the weight that wood normally has with a water content between 10–70% prior to impregnation.

Impregnation of textiles

Textiles made of materials such as rayon, cotton, wool, compound textiles or textiles of other combustible, water-absorbent materials, are dipped in the solution or sprayed by the solution. The concentration of the solution will depend on the method of treatment and this will typically be within a range from 5 to 20 weight percentage of solids calculated on the basis of the weight of the total solution, where particles with a diameter larger than 100 micrometers are filtered away. When dipping, the excess liquid is squeezed out, then the textiles are dried, and after drying the textiles must show an increased weight of between 10 and 15 per cent in the form of solids from the mixture.

Impregnation of paper and other paper products

Paper and paper products can be impregnated in the same way as textiles.

Technical fire tests

The effectiveness of the mixture has been demonstrated in technical fire tests of three different materials: a) spruce paneling, b) pine and c) cotton curtains. Samples a) and b) were impregnated with the same mixture in accordance with the invention, produced in accordance with the method described above, where the finished mixture had the following constituents:

| | |
|---|---|
| ammonium sulphate | 105 g |
| monoammonium phosphate | 154 g |
| diammonium phosphate | 105 g |
| EDTA | 28 g |
| NaHCO$_3$ | 8.4 g |
| Water | 600 g. |

The wood in a) and b) was impregnated in accordance with NO Patent Specification no. 155,835, where a) was impregnated at 12 bar for one hour to give an absorption of impregnation agent of an average of 45 weight %, based on the weight of the non-impregnated wood and the dry ingredients in the impregnation mixture, and b) was impregnated at 12 bar for two hours to give an average absorption of impregnation agent of 43 weight %, based on the weight of the non-impregnated wood and the dry ingredients in the impregnation mixture. After being dried in the normal way, samples a) and b) were subjected to technical fire tests in accordance with Norwegian Standard NS-INSTA 412. The results are presented in FIGS. 1 and 2.

The curtain, sample c), was impregnated by washing in a standard washing machine, where the impregnation mixture consisted of:

| | |
|---|---|
| water | 874.5 g |
| ammonium sulphate | 22.8 g |
| monoammonium phosphate | 87.4 g |
| EDTA | 5.0 g |
| NaHCO$_3$ | 5.0 g |
| UFS75 | 0.7 g |
| U6 | 4.6 g. |

The impregnation solution which here was supplied with a total weight of 1000 g, had a content of 12.02 weight percentage dry constituents apart from the additives. The additive UFS75 is a softener that has an antistatic effect, U6 is an emulgator; both are from Unger Fabrikker in Fredrikstad, Norway. The curtains were washed in the normal way, rinsed and spun, then the final rinsing program had the rinsing solution replaced by the above-mentioned impregnation solution. After spinning and drying, the curtains were supplied 12.7 weight % impregnation agent, based on the weight of the non-impregnated curtains and dried impregnation agent. The curtains were then cut into smaller pieces and subjected to technical fire tests in accordance with test method IMO Res. 471 (XII). The results are given in the following table.

Test results a) The results of the spruce paneling test are given in FIG. 1, this shows that the impregnated spruce paneling satisfied the technical fire specifications in NS 3903 by a good margin, both with respect to temperature and performed exceptionally well concerning smoke development, which is practically 0. After 10 minutes testing the temperature was measured to be about 140° lower than the acceptable temperature limit. During the entire test, there was no smoke development of any note, this was well inside the acceptance criterion.

b) The results for pine show a little less resistance at the start compared to spruce, but this evens out after about 6 minutes and, at the end of the test, pine gives a slightly better result than spruce. There is however more smoke density for pine than with spruce, nevertheless the results for pine were within the technical fire test specifications by a good margin.

c) The results from the technical fire tests for impregnated cotton curtains are given below, where the product satisfies the stipulated demands for resistance to ignition by flames in accordance with IMO Res. A. 471 (XII).

| Burner position | Ignition time (s) | After-flame time (s) | Length of burnt/carbonized matter (mm) | Surface flaring Flames (mm) | Ignition of cotton Yes/No |
|---|---|---|---|---|---|
| Surface | 5 | 0 | 55 | 0 | No |
| Surface | 15 | 0 | 78 | 0 | No |
| Edge | 5 | 0 | 45 | 0 | No |
| Edge | 15 | 0 | 90 | 0 | No |
| Edge | 15 | 0 | 95 | 0 | No |
| Edge | 15 | 0 | 85 | 0 | No |
| Edge | 15 | 0 | 90 | 0 | No |

I claim:

1. A method of applying a flame and smoke retarding aqueous solution consisting essentially of: 70–96 weight % ammonium sulphate and ammonium phosphates wherein the ammonium phosphates are selected from the group consisting of monoammonium dihydrogen phosphate and diammonium hydrogen phosphate, the weight % of ammonium phosphates is greater than the weight % of ammonium sulphate, 1–20 weight % NaHCO$_3$, 1–10 weight % EDTA, and water in an amount resulting in an aqueous solution comprising 11–45 weight % solids on the basis of the total weight of the solution, the method comprising the steps of impregnating a water absorbent porous material, such as wood, rayon, cotton, wool and similar textile materials in the solution to obtain saturation and then drying the impregnated material to remove the water so as to leave the components of the flame and smoke retarding composition within the materials to reduce their ability to support a flame and produce smoke when a heat source is applied.

2. A flame and smoke retarding aqueous solution consisting essentially of:
 a) 70–96 weight % ammonium sulphate and ammonium phosphates wherein the ammonium phosphates are selected from the group consisting of monoammonium dihydrogen phosphate and diammonium hydrogen phosphate, the weight % of ammonium phosphates is greater than the weight % of ammonium sulphate;
 b) 1–20 weight % NaHCO$_3$;
 c) 1–10 weight % EDTA; and
 d) the chemical composition is dissolved in a predetermined volume of water to obtain an aqueous solution having a concentration of 11–45 weight % solids on the basis of the total weight of the solution.

3. A method for producing an aqueous solution of a flame and smoke retarding composition consisting of 70–96 weight % ammonium sulphate and ammonium phosphates wherein the ammonium phosphates are selected from the group consisting essentially of monoammonium dihydrogen phosphate and diammonium hydrogen phosphate, the weight % of ammonium phosphates is greater than the weight % of ammonium sulphate, 1–20 weight % NaHCO$_3$, 1–10 weight % EDTA, and water in an amount resulting in a mixture comprising from 11–45 weight % solids on the basis of the total weight of the solution, the method comprising the steps of:
 a) heating the water in a mixing vessel to a temperature from 30° C. to 70° C., thereupon holding this temperature constant throughout the procedure of dissolving the mixture;
 b) adding the ammonium sulphate to the heated water from step a, under constant stirring, until all of the ammonia sulphate is dissolved;
 c) adding the ammonium phosphate to the mixture, under constant stirring, until all of the ammonium phosphate is dissolved;
 d) adding the sodium hydrogen carbonate (NaHCO$_3$) to the mixture in small portions under constant stirring, this addition is to be performed in portions so that the reaction in the mixture after the addition of each portion of sodium hydrogen carbonate is completed before a new portion is added;
 e) adding the EDTA, under constant stirring, until all of it is dissolved in the solution, whereupon the heating is stopped and the mixture is allowed to stand and cool without stirring in the mixing vessel for a period of time so that the solid contaminants are allowed to precipitate; and
 f) decanting and filtering the supernatant from step e so as to remove particles having a diameter larger than 100 micrometers.

4. The method as described in claim 3 wherein the composition is stirred in steps b, c and e a minimum of ten minutes and the mixing vessel is allowed to cool for at least 3–4 hours to allow precipitation of the solid contaminants.

5. The method as described in claim 3, wherein the particles having a diameter larger than 10 micrometers are removed by the filtering step so that the aqueous solution can be used to impregnate wood.

* * * * *